(12) United States Patent
Guerinon et al.

(10) Patent No.: US 7,296,605 B2
(45) Date of Patent: Nov. 20, 2007

(54) EXTENDED-MOBILITY TIRE WITH BEAD HAVING SYMMETRICAL LOAD DISTRIBUTION

(75) Inventors: Bernard Guerinon, Clermont-Ferrand (FR); David Jardine, Clermont-Ferrand (FR); James Robert Anderson, Simpsonville, SC (US); Jean-Jacques Drieux, Volvic (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/105,453

(22) Filed: Apr. 14, 2005

(65) Prior Publication Data

US 2005/0230022 A1    Oct. 20, 2005

Related U.S. Application Data

(63) Continuation of application No. PCT/EP03/11292, filed on Oct. 13, 2003.

(30) Foreign Application Priority Data

Oct. 14, 2002   (FR)   .................................. 02 12754

(51) Int. Cl.
*B60C 15/00*   (2006.01)
*B60C 15/02*   (2006.01)
*B60C 15/024*  (2006.01)

(52) U.S. Cl. ...................... 152/539; 152/544

(58) Field of Classification Search ................ 152/539, 152/544
See application file for complete search history.

(56) References Cited

U.S. PATENT DOCUMENTS

| 5,634,993 A | 6/1997 | Drieux et al. |
| 5,971,047 A | 10/1999 | Drieux et al. |
| 6,357,502 B1 | 3/2002 | Caretta |
| 6,659,149 B2 * | 12/2003 | Pereira et al. ............. 152/544 |
| 2005/0016655 A1 | 1/2005 | Pereira et al. |

FOREIGN PATENT DOCUMENTS

| CA | 2 101 001 | 1/1994 |
| CA | 2 101 970 | 2/1994 |
| WO | WO 01/40000 | * 6/2001 |

* cited by examiner

*Primary Examiner*—Justin R. Fischer
(74) *Attorney, Agent, or Firm*—Buchanan Ingersoll & Rooney PC

(57) ABSTRACT

Vehicle tire including two sidewalls, beads which include a seat and an external flange which are intended to come into contact with a suitable rim, and a carcass reinforcement structure. At least one bead comprises a circumferential cord structure distributed in two regions, and an anchoring region in which the reinforcement structure is anchored in the bead, that region including circumferential cords arranged as stacks distributed symmetrically on opposite sides of the reinforcement structure. The center of inertia of the bead is located in the immediate vicinity of the anchoring region.

10 Claims, 2 Drawing Sheets

EXTENDED-MOBILITY TIRE WITH BEAD HAVING SYMMETRICAL LOAD DISTRIBUTION

This application is a continuation of International Application No. PCT/EP03/11292 filed on Oct. 13, 2003 and which published as WO 2004/035327 on Apr. 29, 2004.

BACKGROUND OF THE INVENTION

The present invention relates to a tire for a vehicle wheel in which at least one of the beads has a bead seat with a generatrix whose axially inner end lies on a circle of diameter greater than the diameter of the circle on which the axially outer end lies. This type of design is particularly suitable for the new generations of tires that can be used, within certain limits, under conditions of low pressure, or even zero or almost zero pressure, with no risk of the tire becoming unseated from the rim on which it is mounted. This design is often referred to by the expression "extended mobility".

For a long time, tire manufacturers have tried to develop a tire avoiding any risk or potential danger in the case of an abnormally low pressure or indeed a complete loss of pressure. One of the difficulties encountered relates to running flat or under very low pressure. This is because, when running with conventional tires at very low pressure, or even zero pressure, there is a very high risk of the beads becoming unseated from the perimeter of the rim against which they would be held by the pressure.

Many solutions have been tested in order to alleviate these drawbacks. Often these solutions create further difficulties as regards mounting the tire on the rim and removing it therefrom.

Moreover, the clamping of the tire onto the rim is an essential function for ensuring the quality of the tire in operation. This is because it has a direct or indirect effect on many aspects, such as mounting or fitting (sometimes called "clipping-in") of the tire, sealing of the tire, rotation on the rim, etc. These functions are all critical and require specific characteristics and rigorous manufacture of the products, particularly if high quality standards are sought. However, the rims and the tires often have, for the same code, slightly different dimensions, principally due to manufacturing tolerances. These dimensional variations make it more difficult to fulfill the various functions listed above.

To fulfill these functions, two broad categories of solutions are used on an industrial scale. Firstly, in the case of conventional tires, the bead wire provides all these functions simultaneously.

More recently, in several types of products manufactured by the Applicant, the conventional bead wire has been replaced with an anchoring region comprising, in particular, arrangements of circumferential cords cooperating with the carcass-type reinforcement structure via an anchoring or bonding mix. Here again, the anchoring region provides all the abovementioned functions.

In both cases, however, it is difficult to optimize certain parameters, as very often the improvement of one is to the detriment of another. This game of seeking a compromise between advantage on the one hand and disadvantage on the other therefore has certain limits, since it is often difficult to tolerate inferior performance as regards some aspects.

Document EP 0 582 196 discloses a tire having a tread extended by two sidewalls, two beads and a carcass anchored in the two beads with an annular reinforcement. The carcass consists of wires placed adjacently and aligned circumferentially and in contact with at least one layer of bonding rubber of very high elastic modulus in the bead fastening region comprising the annular reinforcement. In this tire, the annular reinforcement of the bead fastening region consists of stacks of circumferential wires with a layer of bonding rubber of very high elastic modulus interposed between the carcass reinforcement wires and these stacks. This embodiment is intended for conventional tires in which the beads are held against the rim gutter owing to the tire inflation pressure. In this type of arrangement, the loads are predominantly of lateral or axial type, inducing high compressive forces acting substantially axially from the walls towards the center of the said bead. These forces increase with the inflation pressure. The increase in pressure tends to make the bead slip against the flange, radially outwards. The radially inwardly induced loads on the rim seat decrease with the increase in pressure, or with any increase in the tension of the carcass-type reinforcement structure.

Moreover, it should be pointed out that the stacks of wires are aligned in a direction approximately parallel to the orientation of the profile of the rim flange against which the bead presses. The profile of the bead of this type of tire is relatively narrow and elongate; the anchoring is distributed over most of the height and width of the bead. Passage of the carcass in the bead is in general approximately central with respect to the walls of the said bead. Moreover, in the case of a relatively narrow bead subjected to predominantly axial loads, neither the inflation pressure nor the tension induced in the carcass allow the generation of large moments or couples, tending to make the bead pivot or rotate on itself.

With such a type of tire, if the pressure drops and running continues, the tire is no longer held against the rim and, in most cases, unseating from the rim occurs.

Document EP 0 673 324 discloses a running assembly comprising at least one tire with radial carcass reinforcement anchored in each bead and a rim of particular shape. This rim has a first seat with a generatrix such that the distance of the axially outer end of the said generatrix from the axis of rotation is less than the distance from its axially inner end and is bounded axially to the outside by a rim flange or projection. The tire has bead seats suitable for mounting on this rim. The type of tire/rim interface proposed in that document has many advantages over the solutions already known, especially as regards ease of mounting/demounting, while still allowing a certain travel despite a drop in pressure.

Document EP 0 748 287 discloses a solution allowing a first optimization of the base technology described in the aforementioned document EP 0 673 324. This relates to a tire in which at least one bead has a structure allowing the clamping of the said bead to be modified according to the tension in the carcass reinforcement, and especially to be strengthened when the inflation pressure increases to its normal value. The document thus proposes the use of a bead with anchoring of the end of the carcass by an upturn of the latter around the base of the bead wire, via the axially and radially inner sides with respect to the bead wire. The bead also has, adjacent to the bead wire and axially to the outside of the latter, a profile or wedge made of a rubber mix having a relatively high hardness against which the bead wire can exert a compressive force when the tension in the carcass reinforcement increases. This compressive force results in self-clamping of the bead toe onto the mounting rim. The tension in the carcass therefore causes the bead wire to be displaced outwards, so that the latter generates the said compressive force. In such a configuration, the presence of a conventional bead wire and the upturn of the carcass under the bead wire are presented as being absolutely essential for generating the compressive force. This limits the possibilities of envisaging other types of arrangement.

Moreover, document EP 0 922 592 discloses two embodiments with anchoring of the carcass through an axially outward upturn of the latter. The first embodiment proposes anchoring the carcass in the bead by a radially outward upturn of the end of the carcass. The upturn is surrounded on either side by two radially superimposed layers of metal wires placed axially side by side and covering substantially the entire axial portion along the bead seat. The layers are arranged so as to be parallel to the bead seat. The types of wire and the corresponding dimensions are very precise. The second solution proposed in that document relates to bead seats with different diameters. Securing of the carcass is also effected in a different way than the first solution. The carcass is firstly subdivided into two radially separate portions level with the bead. Each portion is adjoined with a layer of wires placed radially, each layer being placed radially upwardly against each of the carcass portions. The radially outer carcass portion and the radially inner layer of wires are separated by an elastomer-type insert of high hardness provided in the bead. This insert axially lines the central portion of the bead and rises radially outwards and axially inwards, beyond the radial limit of where the metal wires are present.

Both examples of solutions in document EP 0 922 592 have several drawbacks. Thus, the carcass securing proposed in that document requires the presence of an axially outward upturn of the end portion of the carcass. Moreover, the superimposed layers of wires are placed radially close to the bead seat, to a great extent at a radial position closer to the rotation axis than the top portion of the flange on which the bead bears. Unless highly extensible wires are used, mounting/demounting of the tire is difficult to accomplish, owing to the radially unfavourable position of the wires. It should also be pointed out that the stacks are oriented substantially parallel to the profile of the seat against which the bead bears. According to the second solution, the carcass is subdivided into two portions and an insert of high hardness is needed to separate, on the one hand, the layers of wires and, on the other hand, the two carcass portions. However, the carcass is not anchored in the insert. The shape of the insert described is restricting.

Document WO 01/39999 discloses an extended-mobility tire in which each of the beads has an inverted seat, an anchoring region, a bearing region and a transition region. Each of the regions taken in isolation, and likewise all of the regions, form as it were an internal bead capable of undergoing relative movements such as, for example, angular or rotational movements, with respect to another region, or with respect to a virtual center of pressure CP, or with respect to the rim seat, etc.

Preferably, the said bearing region is substantially elongate. It extends, for example, substantially along the bead seat. Load transfer during rotation of the bottom region from the axially internal portion towards the axially external portion is thus possible, with continuation of bearing against at least one portion of the bead seat. Load transfer ensures self-clamping of the toe of the bead against the rim.

SUMMARY

The present invention therefore aims to alleviate the various inherent drawbacks of the abovementioned solutions.

To achieve this, it provides a tire for a vehicle wheel, comprising:
  two sidewalls spaced apart axially and joined together by their radially outer portions by a crown region provided on its radially outer portion with a circumferential tread;
  beads placed radially to the inside with respect to each of the sidewalls, each bead having a seat and an external flange which are intended to come into contact with a suitable rim;
  a reinforcement structure extending approximately radially from each of the beads, along the sidewalls, towards the crown region;
  at least one of the said beads comprising:
    a bead seat having a generatrix whose axially inner end lies on a circle of diameter greater than the diameter of the circle on which the axially outer end lies,
    an anchoring region in which the reinforcement structure is anchored in the said bead, comprising a grouping of circumferential cords placed substantially adjacent to one portion of the reinforcement structure and comprising at least two stacks distributed on either side of the reinforcement structure, a bonding mix being placed between the circumferential cords and the reinforcement structure,
    a bearing region for the said bead extending substantially along the bead seat, and
    the said anchoring region being arranged in the said bead in such a way that, under normal pressure, the loads on the reinforcement structure are distributed substantially uniformly on either side of the said structure, in the said anchoring region.

Such a configuration allows optimum distribution of the loads within the anchoring region, in particular within the grouping of circumferential cords. For example, it prevents there being substantial differences both in the nature and the level of the stresses to which the various cords of the grouping are subjected, like, for example, some cords being subjected to tensile loads with others being subjected to compressive loads.

This more uniform stress distribution is particularly advantageous for certain types of tires, especially those of large sidewall height, such as for SUVs.

According to an advantageous alternative embodiment of the tire according to the invention, between values corresponding to approximately zero pressure and normal operating pressure, the pressure distribution along the bearing region is substantially independent of the said pressure value. Upon inflation of the tire, the effects induced on the load distribution along the interface between the bearing region and the rim seat do not affect the said distribution substantially. Dynamic stability, which guarantees better clamping on the rim, is obtained whatever the condition and independently of the tolerances. The internal stresses, particularly within the tire bead, are dynamically stable, contributing to the durability of the product. Dynamic stability also prevents the generation of undesirable stresses within the bead, such as for example stresses liable to affect the properties or the quality of the product. Moreover, the sensitivity to variations in tolerances of the rim/tire assembly is lower.

Advantageously, an outer lateral region is placed in that region of the bead which is designed to be positioned between the flange or gutter of the rim and the anchoring region. This region is preferably furnished with a rubber mix of substantially high modulus, for example between 10 and 40 MPa.

Advantageously, the outer lateral region is provided in the axially external portion of the bead and extends between the portion adjacent to the rim flange and the anchoring region. Advantageously, it cooperates with the anchoring region, thereby optimizing the mechanical action between the said anchoring region and that portion of the bead which is adjacent to the rim flange.

This region makes it possible to increase the clamping pressure, especially in the area of the rim flange. Thanks to its reduced deformability, it reduces the tendency of the bead to slip radially outwards beyond the rim flange. It also contributes, on the one hand, to preventing any tendency to generate a turning moment and, on the other hand, to establishing dynamic stability, such as for example in turns or when subjected to high lateral stresses.

Advantageously, the said loads on the reinforcement structure generate a substantially symmetrical, or only slightly unsymmetrical, bead clamping pressure on either side of the reinforcement structure.

Such a configuration makes it possible to go some way towards obtaining a substantially uniform clamping pressure along the bead seat. The abovementioned qualities/properties are thus further optimized. In the absence of large imbalances, excellent mounting stability and increased durability are obtained.

The grouping of circumferential cords in the anchoring region is preferably distributed symmetrically on either side of the reinforcement structure.

The anchoring region is advantageously in the immediate vicinity of the center of inertia of the bead. This allows minimization of the tendency of the bead to rotate about itself; consequently, one major source of stress imbalances is limited. According to one advantageous embodiment, the center of inertia lies in the anchoring region, preferably in the immediate vicinity of the reinforcement structure (or even coincident therewith).

The anchoring region does not include a bead wire, especially a bead wire of conventional type, such as for example, a multifilament bead wire against which a carcass ply is turned up, so that the region of cooperation between the turned-up ply portion and the bead wire provides retention of the carcass ply.

The reinforcement structure of the sidewalls and of the crown is advantageously of carcass type, its mechanical properties being similar to those of carcass plies of known type. Moreover, this reinforcement structure is advantageously configured without any axial separation within the bead. Thus, all the wires of the circumferential grouping preferably occupy substantially the same axial position.

The bearing region is preferably substantially adjacent to the rim seat.

Preferably, the bearing region is formed substantially from a high-modulus rubber mix.

The presence of a high-modulus rubber region in a radially internal portion with respect to the flange provides good axial retention and prevents the bead from slipping axially outwards.

According to one particularly advantageous method of manufacture, in which the various constituents of the tire are placed directly on a central core, the shape of which gives the tire under manufacture a shape substantially similar to the shape of the end product, elimination of the upturn (which exists with a conventional architecture) advantageously simplifies manufacture.

According to an advantageous embodiment of the invention, the bases of the stacks (i.e. the cords radially closest to the axis of rotation of the tire) are placed radially further to the outside than the end of the said flange (the portion of the said flange axially and radially closest to the outside). The bases of the stacks are advantageously intended to be placed radially outside the flange of the rim tailored to the tire. The mounting/demounting operations are therefore facilitated.

Advantageously, the carcass-type reinforcement structure extends approximately radially from each of the beads, along the sidewalls, towards the crown region. The said structure may thus be a single structure and extend from one bead to the other, or else it may be split into two half-structures, each extending along a single sidewall.

The number of stacks and the number of windings or turns of each of the stacks is advantageously determined according to the desired characteristics of the tire, for example its service pressure. For example, a higher number of stacks may be desired so as to increase the stiffness within the bead region.

The carcass-type reinforcement structure preferably consists of a cord winding making round trips between the two beads, forming loops in each of the beads. Moreover, the cord winding preferably consists of a single cord.

According to another advantageous variant, the inner bead designed to be placed on the internal side of the wheel and the outer bead intended to be installed on the external side of the wheel are arranged asymmetrically. Thus, for example, the number of stacks or the number of turns of each of the stacks may be different, for example so that the number of stacks of cords in the outside bead is different from the number of stacks of cords in the inside bead.

According to another aspect, the symmetry relates to the arrangements of the anchoring and bearing regions. Each of the beads may have different architectures in which, for example, the shapes, the arrangements and the dimensions of one or more of the regions may vary. It is also possible to vary the constituent materials and the mechanical properties, such as the hardness for example, and likewise the number of regions.

DESCRIPTION OF THE DRAWINGS

Further features and advantages of the invention will become apparent on reading the embodiments of the tire according to the invention, given by way of non-limiting example and with reference to FIGS. 1 to 3 appended hereto, in which.

DESCRIPTION OF A PREFERRED EMBODIMENT

Figure 1:
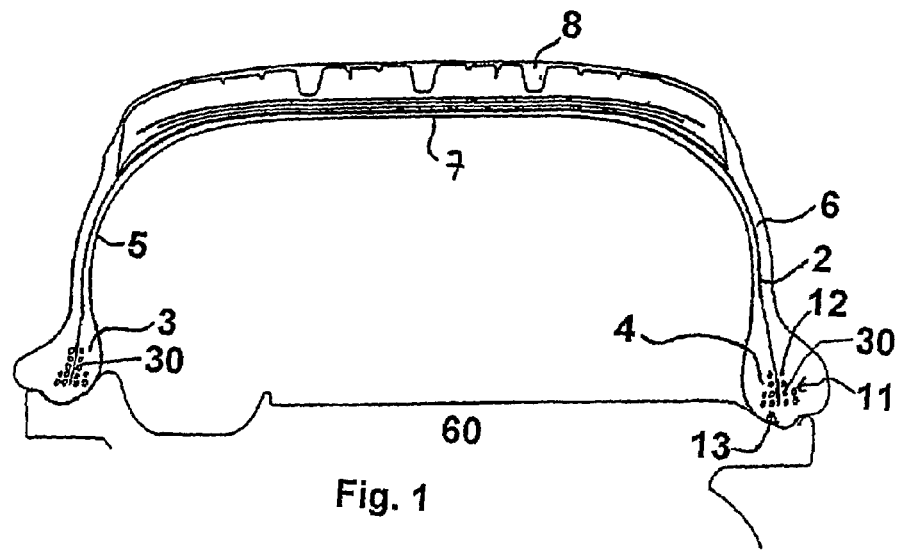
FIG. 1 illustrates, in cross section, a tire according to the invention.

The bracing or reinforcement of tires consists at the present time—and most commonly—of a stacking of one or more plies conventionally called "carcass plies", "crown plies", etc. This way of denoting the bracing stems from the manufacturing process, which consists in producing a series of semi-finished products in the form of plies which are provided with often longitudinal wire reinforcements and are consequently assembled or stacked so as to build up a tire preform. The plies are produced flat, with large dimensions, and are subsequently cut up according to the dimensions of a given product. The plies are also assembled, in a first stage, substantially flat. The preform thus produced is then formed in order to adopt the typical toroidal profile of tires. So-called "finish" semi-finished products are then applied to the preforms in order to obtain a product ready for vulcanization.

Such a "conventional" type of process involves, particularly as regards the phase of manufacturing the tire preform, the use of an anchoring element (generally a bead wire) used to anchor or retain the carcass reinforcement in the region of the tire bead. Thus, for this type of process, one portion of all of the plies making up the carcass reinforcement (or only one part) is turned up around a bead wire placed in the bead of the tire. This as it were anchors the carcass reinforcement in the bead.

The generalization in industry of this type of conventional process, despite many variations in the way in which the plies and the assemblies are produced, has led the person skilled in the art to use a vocabulary taken from the process: hence the generally accepted terminology, especially the terms "plies", "carcass", "bead wire", "shaping", etc. to denote the transition from a flat profile to a toroidal profile, etc.

However, nowadays there are tires which strictly speaking do not have "plies" or "bead wires" according to the above definitions. For example, document EP 0 582 196 discloses tires manufactured without the aid of semi-finished products in the form of plies. For example, the cords of the various reinforcement structures are applied directly to the adjacent rubber mix layers, the whole assembly being applied in successive layers to a toroidal core, the shape of which results directly in a profile similar to the final profile of the tire under manufacture. Thus, in this case, there are no longer "semi-finished" products or "plies" or "bead wires". The base products, such as rubber mixes and the reinforcements in the form of cords or filaments, are directly applied to the core. This core, being toroidal in shape, no longer has to form a preform in order to go from a flat profile to a torus-shaped profile.

Moreover, the tires disclosed in that document do not have the "conventional" carcass ply upturn around a bead wire. This type of anchoring is replaced with an arrangement in which circumferential filaments are placed adjacent to the said sidewall reinforcement structure, the whole assembly being embedded in a rubber anchoring or bonding mix.

There are also processes for assembling on a toroidal core which use semi-finished products especially suitable for rapid, effective and simple laying on a central core. Finally, it is also possible to use a hybrid, comprising both certain semi-finished products in order to produce certain architectural aspects (such as plies, wire beads, etc.), while others are produced from the direct application of mixes and/or reinforcements in filament form.

In the present document, to take into account recent technological developments both in the manufacturing field and in product design, the conventional terms such as "plies", "bead wires", etc, are advantageously replaced with neutral terms or terms independent of the type of process used. Thus, the term "carcass-type reinforcement" or "sidewall reinforcement" is valid for denoting the reinforcement wires of a carcass ply in the conventional process, and the corresponding cords, which are in general applied to the sidewalls, of a tire built using a process without semi-finished products. As regards the term "anchoring region", this may denote just as well the "traditional" carcass ply upturn around a bead wire of a conventional process as the assembly, formed by the circumferential filaments, the rubber mix and the adjacent sidewall reinforcement portions of a bottom region, produced using a process with application on a toroidal core.

In the present description, the term "cord" denotes entirely generally monofilaments and multifilaments or wire assemblies such as cables, twisted yarns or even any type of equivalent assembly, this being so whatever the material and the treatment of these cords. For example, these may undergo surface treatments, coating or presizing in order to promote adhesion to the rubber. The expression "individual cord" denotes a cord composed of a single element, with no assembly. In contrast, the term "multifilament" denotes an assembly consisting of at least two individual elements forming a cable, twist yarn, etc.

On the other hand, the term "radial structure" is understood to mean an arrangement at 90 degrees, but also, depending on the usage, at an angle close to 90°.

It is known that, traditionally, the carcass ply or plies are turned up around a bead wire. The bead wire therefore fulfills a carcass anchoring function. Thus, in particular it withstands the tension developed in the carcass cords, for example owing to the effect of the inflation pressure. The arrangement described in the present document fulfills a similar anchoring function. It is also known to use the conventional bead wire to fulfill the function of clamping the bead against a rim. The arrangement described in the present document also allows a similar clamping role to be fulfilled.

In the present description, the term "bonding" mix or rubber is understood to mean the rubber mix optionally in contact with the reinforcement cords, which adheres to the latter and is capable of filling the interstices between adjacent cords.

The term "contact" between a cord and a bonding rubber layer means that at least part of the external circumference of the cord is in intimate contact with the rubber mix constituting the bonding rubber.

The "sidewalls" denote those portions of the tire which are usually of low flexural rigidity and are located between the crown and the beads. The term "sidewall mixes" refers to the rubber mixes placed axially at the outside relative to the cords of the carcass reinforcement structure and to their bonding rubber. These mixes usually have a low elastic modulus.

The term "bead" refers to that portion of the tire which is radially internally adjacent to the sidewall.

The term "elastic modulus" of a rubber mix is understood to mean an extension secant modulus obtained for a deformation in uniaxial extension of about 10% at room temperature.

FIG. 1 illustrates, in cross section, a tire 1 according to the invention. This tire comprises a first sidewall 5 adjacent to a first bead 3 preferably corresponding to the inner bead. Similarly, the opposite portion of the tire comprises a second sidewall 6 adjacent to a second bead 4. A crown 7, on which a tread 8 is provided, joins the sidewalls together. The crown preferably includes at least one bracing belt.

The tire has a carcass-type reinforcement structure 2 provided with reinforcements advantageously configured in an approximately radial arrangement. This structure may be placed so as to go continuously from one bead to the other, passing through the sidewalls and the crown, or else it may consist of two or more parts, placed for example along the sidewalls, without covering all of the crown.

The end portions 21 of the reinforcement structure 2 are located in the beads.

The reinforcement structure 2 may be produced by winding a single cord, making round trips between the two beads, forming loops in each of the beads. These loops, coated in the rubber mix, contribute to the mechanical bonding between the reinforcement structure 2 and the bead, especially the stacks 13. From the presence of loops between the "outward" travel and the "return" travel of the cord, it may be seen that the reinforcement is of the monofilament type. Of course, it would be possible for the carcass not to be manufactured continuously from a single cord and for it not to have loops therein, but for example cut ends instead.

The bead also includes an approximately circumferential anchoring region 30 which comprises a grouping of circumferential cords placed so as to be substantially adjacent to one portion of the reinforcement structure and comprises at least two stacks distributed on either side of the reinforcement structure, a bonding (or anchoring) mix being placed between the circumferential cords and the reinforcement structure.

In the anchoring region, at least one cord 12 of one of the stacks 13 is preferably placed in the immediate vicinity of a portion 21 of the reinforcement structure 2. The stacks may also be arranged so that a portion 21 is inserted between stacks 13.

In the anchoring region, the space between the cords 12 and the reinforcement structure 2 is occupied by a rubber bonding mix 14. It is also possible to use several mixes having different properties, defining several regions, the combinations of mixes and resulting arrangements being almost limitless. According to an advantageous variant, a rubber mix having a substantially high modulus is provided in the region of intersection between the cord grouping 11 and the reinforcement structure 2. As a non-limiting example, the elastic modulus of such a rubber may reach 10 to 20 MPa and even exceed 40 MPa.

The cord groupings 11 may be arranged and manufactured differently. For example, a stack 13 may advantageously consist of a single cord 12, wound (at approximately zero degrees) in a spiral, preferably from the smallest diameter towards the largest diameter. A stack may also consist of several concentric cords placed one in another.

Figure 2:
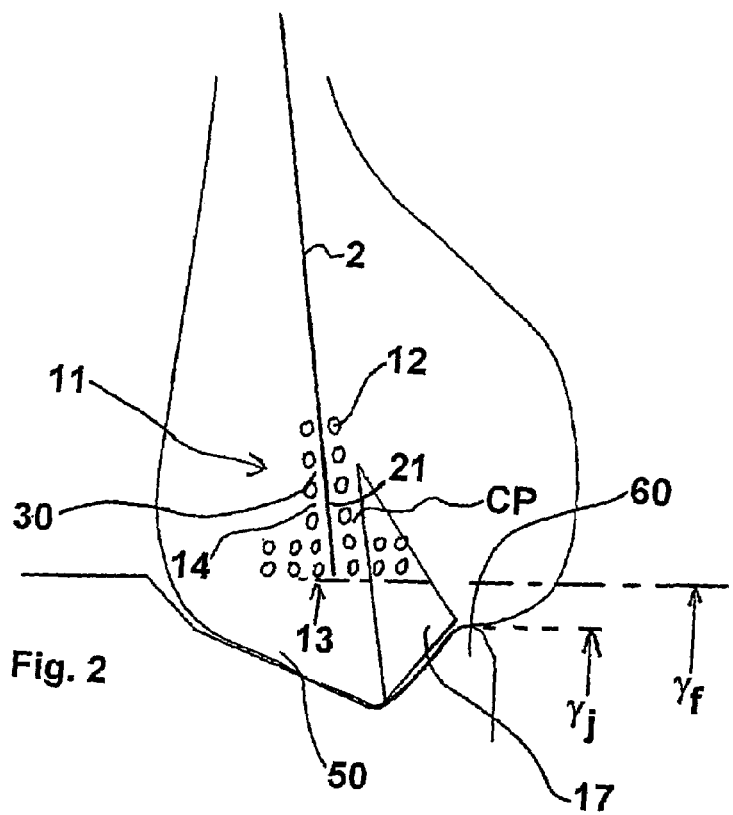
FIG. 2 illustrates, in enlarged cross section, a bead of a first embodiment of a tire according to the invention.
Figure 3:
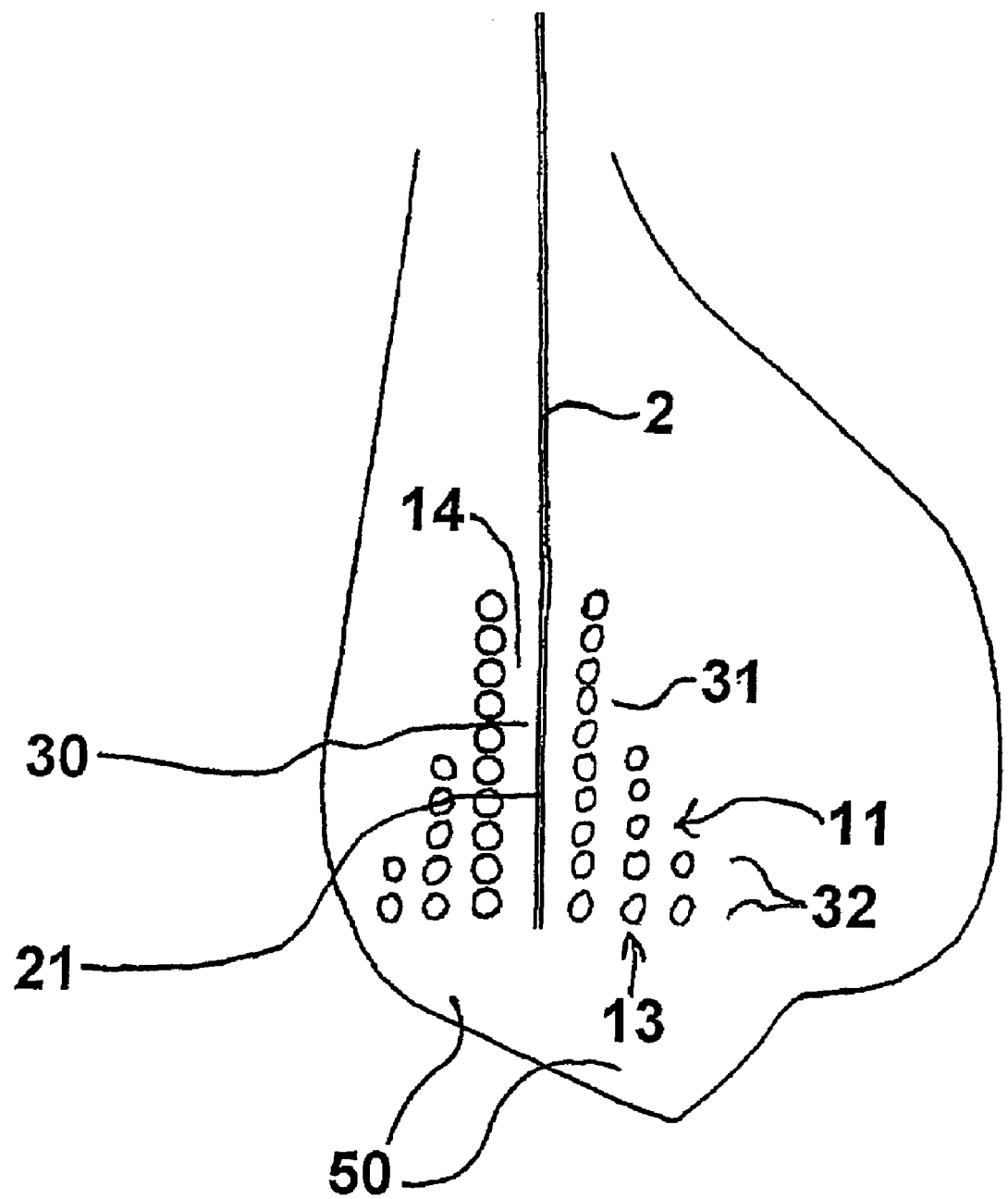
FIG. 3 illustrates, in enlarged cross section, a bead of a second embodiment of a tire according to the invention.

FIGS. 2 and 3 illustrate examples of beads in which the anchoring regions 30 are arranged in the said bead in such a way that, under normal pressure, the loads on the reinforcement structure are distributed substantially uniformly on either side of the said structure, in the said anchoring region.

This is a structure exhibiting approximate dynamic stability since, on inflating the tire, between zero pressure and a normal operating pressure (such as, for example, between 1.5 and 3 bar in the case of a private vehicle, and more particularly between 1.8 and 2.5 bar), the pressure distribution along the bearing region remains similar.

Such dynamic stability may advantageously be achieved by a symmetrical arrangement of the anchoring elements, especially of the circumferential cords which in these two examples are distributed symmetrically on either side of the reinforcement structure. Thus, in FIG. 2, there is an arrangement of circumferential cords in the form of an upside-down "T", whereas in FIG. 3 the arrangement resembles more a truncated pyramid.

The anchoring region is advantageously provided in the immediate vicinity of the center of the inertia CP of the bead, with at least one of the stacks 13 disposed axially outwardly of the center of inertia (see FIG. 2). The center of inertia CP is disposed in a portion of the anchoring region whose axial borders are defined by the reinforcement structure 21 and the stack 13 situated closest to the axially outwardly facing side of the reinforcement structure.

The loads may be distributed along the bearing region in a progressive (linear or non-linear) manner but are advantageously distributed approximately symmetrically on either side of the reinforcement structure.

In the embodiment illustrated in FIGS. 2 and 3, the bead also includes a bearing region 50 lying substantially between the anchoring region and the bead seat and aligned approximately axially with these regions, the said region being suitable for being put into compression when the tire is mounted on a suitable rim. Compressing this region contributes to clamping the tire, by transmitting the clamping force produced by the clamping region. The rubber mix in this region is selected so as to provide good creep resistance, so as to ensure durability of the clamping characteristics.

An outer lateral region 17 is provided in that region of the bead which is designed to be placed between the flange or gutter 60 of the rim and the anchoring region. This region is preferably furnished with a rubber mix of substantially high modulus, for example between 10 and 40 MPa.

This region makes it possible to increase the clamping pressure, especially in the area of the rim flange. Thanks to its reduced deformability, it reduces the tendency of the bead to slip radially outwards beyond the rim flange. It also contributes, on the one hand, to preventing any tendency to generate a turning moment and, on the other hand, to establish dynamic stability, such as for example in turns or when subjected to high lateral stresses.

Advantageously, the outer lateral region 17 is provided in the axially external portion of the bead and extends between the portion adjacent to the rim flange and the anchoring region. Advantageously, it cooperates with the anchoring region, thereby optimizing the mechanical action between the said anchoring region and that portion of the bead which is adjacent to the rim flange.

The tire according to the invention is particularly suitable for being used on a rim of the type described in document EP 0 673 324. Such a rim has a seat and preferably an upstand or flange located axially and radially to the outside.

The bases of the stacks (i.e. the cords radially closest to the axis of rotation of the tire) are preferably placed radially further to the outside than the end of the said flange (the portion of the said flange axially and radially closest to the outside), as illustrated in FIG. 3. The bases of the stacks are advantageously intended to be placed radially outside the flange of the rim 60 (or rim gutter) tailored to the tire. The mounting/demounting operations are therefore facilitated. Thus, FIG. 2 shows that $r_f$ (radius of the first cords) is greater than $r_j$ (radius of the flange or gutter of the rim). This radius corresponds to the distance from the rotation axis.

The various embodiments described and/or illustrated may advantageously be produced with devices of the type of those described in document EP 0 580 055.

Thus, for example, it is very advantageous to build the tire on a central core, imposing the shape of its internal cavity. Placed on this core, preferably in the order required by the final architecture, are all the constituents of the tire, which are placed directly in their final position, according to a substantially final profile. In this case, such a tire may be moulded and vulcanized as explained in document U.S. Pat. No. 4,895,692.

The invention claimed is:

1. A tire for a vehicle wheel, comprising:
   two sidewalls spaced apart axially and joined together by their radially outer portions by a crown region provided on its radially outer portion with a circumferential tread;

beads placed radially to the inside with respect to each of the sidewalls, each bead having a seat and an external flange which are intended to come into contact with a suitable rim;

a reinforcement structure extending approximately radially from each of the beads, along the sidewalls, towards the crown region;

at least one of the said beads comprising:

a bead seat having a generatrix whose axially inner end lies on a circle of diameter greater than the diameter of the circle on which the axially outer end lies, an anchoring region in which the reinforcement structure is anchored in the bead, comprising a grouping of circumferential cords placed substantially adjacent to one portion of the reinforcement structure and comprising at least two stacks distributed on each side of the reinforcement structure, a bonding mix being placed between the circumferential cords and the reinforcement structure, a bearing region for the said bead extending substantially along the bead seat, and in which the grouping of circumferential cords in the anchoring region is distributed symmetrically on either side of the reinforcement structure and in which the center of inertia of the bead is in the immediate vicinity of the anchoring region, wherein at least one of the stacks is situated axially outwardly of the center of inertia.

2. The tire of claim 1, which also includes an outer lateral region placed in that region of the bead which is designed to be positioned between the flange of the rim and the anchoring region, the said region preferably being furnished with a rubber mix of substantially high modulus.

3. The tire of claim 2, in which the outer lateral region is provided in the axially external portion of the bead and extends between the portion adjacent to the rim flange and the anchoring region.

4. The tire of claim 2, in which the outer lateral region cooperates with the anchoring region.

5. The tire of claim 1 wherein the center of inertia coincides with the reinforcement structure.

6. A tire for a vehicle wheel, comprising:

two sidewalls spaced apart axially and joined together by their radially outer portions by a crown region provided on its radially outer portion with a circumferential tread;

beads placed radially to the inside with respect to each of the sidewalls, each bead having a seat and an external flange which are intended to come into contact with a suitable rim;

a reinforcement structure extending approximately radially from each of the beads, along the sidewalls, towards the crown region;

at least one of the beads comprising:

a bead seat having a generatrix whose axially inner end lies on a circle of diameter greater than the diameter of the circle on which the axially outer end lies, an anchoring region in which the reinforcement structure is anchored in the bead, comprising a grouping of circumferential cords placed substantially adjacent to one portion of the reinforcement structure and comprising at least two stacks distributed adjacent axially inwardly and axially outward facing sides, respectively, of the reinforcement structure, a bonding mix being placed between the circumferential cords and the reinforcement structure, a bearing region for the said bead extending substantially along the bead seat, and in which the grouping of circumferential cords in the anchoring region is distributed symmetrically with respect to the reinforcement structure and in which the center of inertia of the bead is situated within a portion of the anchoring region whose axial borders are defined by the reinforcement structure and the stack situated closest to the axially outwardly facing side of the reinforcement structure.

7. The tire of claim 6, which also includes an outer lateral region placed in that region of the bead which is designed to be positioned between the flange of the rim and the anchoring region, the outer lateral region being furnished with a rubber mix of substantially high modulus.

8. The tire of claim 7, in which the outer lateral region is provided in the axially external portion of the bead and extends between the portion adjacent to the rim flange and the anchoring region.

9. The tire of claim 7, in which the outer lateral region cooperates with the anchoring region.

10. The tire of claim 6 wherein the center of inertia coincides with the reinforcement structure.

* * * * *

UNITED STATES PATENT AND TRADEMARK OFFICE
CERTIFICATE OF CORRECTION

PATENT NO.       : 7,296,605 B2                                                Page 1 of 1
APPLICATION NO.  : 11/105453
DATED            : November 20, 2007
INVENTOR(S)      : Bernard Guerinon et al.

It is certified that error appears in the above-identified patent and that said Letters Patent is hereby corrected as shown below:

TITLE Page - Assignee city name Item 73

Change "Granges-Baccot" to read --Granges-Paccot--

Signed and Sealed this

Twenty-second Day of July, 2008

JON W. DUDAS
*Director of the United States Patent and Trademark Office*